US012794280B2

(12) United States Patent
Tamura

(10) Patent No.: US 12,794,280 B2
(45) Date of Patent: Nov. 10, 2026

(54) STATOR CORE AND MANUFACTURING METHOD

(71) Applicant: NHK SPRING CO., LTD., Yokohama (JP)

(72) Inventor: Tatsuji Tamura, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 324 days.

(21) Appl. No.: 18/718,367

(22) PCT Filed: Dec. 14, 2022

(86) PCT No.: PCT/JP2022/046089
§ 371 (c)(1),
(2) Date: Jun. 10, 2024

(87) PCT Pub. No.: WO2023/112969
PCT Pub. Date: Jun. 22, 2023

(65) Prior Publication Data

US 2026/0261163 A1 Sep. 3, 2026

(30) Foreign Application Priority Data

Dec. 15, 2021 (JP) ................................ 2021-203169

(51) Int. Cl.
*H02K 1/14* (2006.01)
*H02K 15/027* (2025.01)
(Continued)

(52) U.S. Cl.
CPC .......... *H02K 1/146* (2013.01); *H02K 15/027* (2025.01); *H02K 15/0273* (2025.01)

(58) Field of Classification Search
CPC ........... H02K 1/06; H02K 1/146; H02K 1/16; H02K 15/02; H02K 15/027; H02K 15/0273; H02K 15/0278
See application file for complete search history.

(56) References Cited

U.S. PATENT DOCUMENTS

2017/0338724 A1 11/2017 Arakawa et al.
2019/0109522 A1* 4/2019 Hasuo .................... H02K 1/146
(Continued)

FOREIGN PATENT DOCUMENTS

JP 2017-5785 A 1/2017
JP 2017-208955 A 11/2017
(Continued)

OTHER PUBLICATIONS

U.S. Appl. No. 18/718,367, filed Jun. 11, 2026_WO_2017104403_A1_H.pdf (Year: 2026).*
(Continued)

*Primary Examiner* — Christopher M Koehler
*Assistant Examiner* — Ahmed F Seck
(74) *Attorney, Agent, or Firm* — Norris McLaughlin, P.A.

(57) ABSTRACT

A stator core in which stator pieces having teeth segments on an inner periphery of an annular yoke segment are laminated, comprises a diametrally recessed portion on an outer edge of the stator piece, a diametrally projected segment portion provided in the diametrally recessed portion, a depressed portion and a projected portion in a laminating direction provided respectively on a top face and a bottom face of the diametrally projected segment portion, a fitted portion in which the depressed portion and the projected portion in the laminating direction are fitted by fastening between the stator pieces, and a welded portion welding the depressed portion and the projected portion of the fitted portion in the laminating direction.

11 Claims, 6 Drawing Sheets

(51) Int. Cl.
*H02K 15/0273* (2025.01)
*H02K 1/16* (2006.01)

(56) References Cited

U.S. PATENT DOCUMENTS

2020/0014256 A1* 1/2020 Arakawa .................. H02K 1/18
2020/0127522 A1* 4/2020 Fukunaga ................ H02K 1/14

FOREIGN PATENT DOCUMENTS

WO WO-2017104403 A1 * 6/2017 ............. H02K 15/02
WO WO-2018110300 A1 * 6/2018 ........... H02K 15/021

OTHER PUBLICATIONS

U.S. Appl. No. 18/718,367, filed Jun. 11, 2026_WO_2018110300_A1_H.pdf (Year: 2026).*

* cited by examiner

STATOR CORE AND MANUFACTURING METHOD

FIELD OF THE INVENTION

The present invention relates to a stator core for an electric motor and the like and a manufacturing method.

BACKGROUND OF THE INVENTION

As a conventional stator core, there is one composed of a plurality of laminated stator plates as disclosed in Patent document 1. The plurality of the stator plates are fixed together through calking and fixing portions and are welded through welded portions overlapping the fastening and fixing portions.

With the configuration, the calking and fixing portions and the welded portions causing iron loss overlap each other to suppress the iron loss of the stator core.

The calking and fixing portions and the welded portions are, however, provided within a yoke. Accordingly, residual stress caused by the calking and shrinkage action caused by the welding are directly affected to the yoke and there is a limit on suppressing the iron loss even if the calking and fixing portions and the welded portions are overlapped.

PATENT LITERATURE 1: JP2017-5785A

SUMMARY OF THE INVENTION

A problem to be solved is that there is a limit on suppressing iron loss.

The present invention provides a stator core in which stator pieces each having teeth segments on an inner periphery of an annular yoke segment are laminated, the stator core comprising a diametrally recessed portion on an outer edge of the stator piece, a diametrally projected segment portion provided in the diametrally recessed portion, a depressed portion and a projected portion in a laminating direction provided respectively on a top face and a bottom face of the diametrally projected segment portion, a fitted portion in which the depressed portion and the projected portion in the laminating direction are fitted by fastening between the stator pieces, and a welded portion welding the depressed portions and the projected portions of the fitted portion in the laminating direction.

Further, the present invention provides a manufacturing method of the stator core comprising forming the stator piece having the diametrally recessed portion, the diametrally projected segment portion, and the depressed portion and the projected portion in the laminating direction, laminating a plurality of the stator pieces to form the fitted portions with fastening, and welding the laminated stator pieces in the laminating direction to form the welded portion.

The stator core according to the present invention suppresses an influence range of iron loss caused by the fitted portion and the welded portion from entering into the yoke relative to an outer peripheral face of the stator core as much as possible.

The manufacturing method of a stator core according to the present invention easily and surely obtains the stator core that suppresses an influence area of iron loss caused by the fitted portion and the welded portion from entering into the yoke relative to an outer peripheral face of the stator core as much as possible.

BRIEF DESCRIPTION OF THE DRAWINGS

FIG. 9A and FIG. 9B are a modified example 3 of the embodiment, in which FIG. 9A is a plan view conceptually illustrating part of a stator piece with enlargement for indicating a range of a depressed portion and a projected portion of a projected segment portion and FIG. 9B is a plan view of the stator piece for additionally indicating a welding range.

EMBODIMENT FOR CARRYING OUT THE INVENTION

Figure 1:
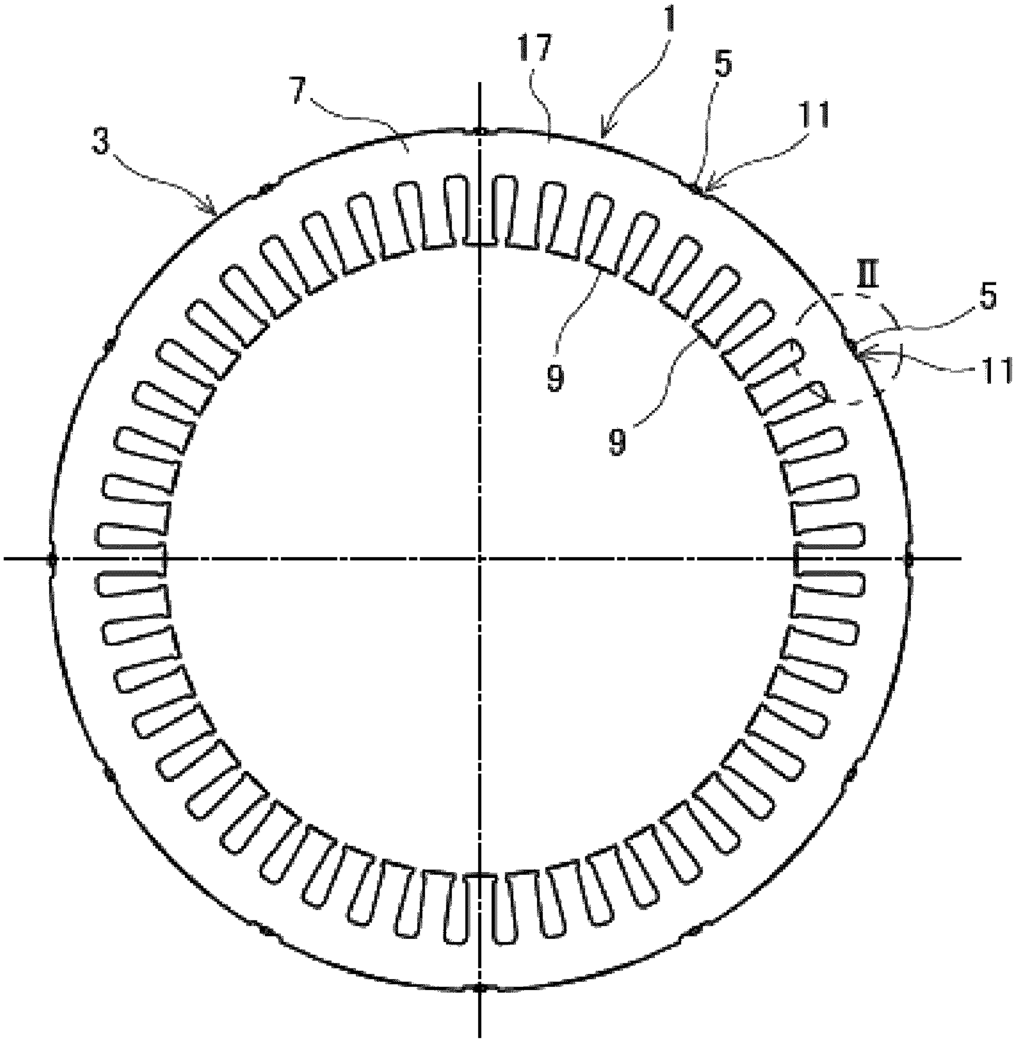
FIG. 1 is a plan view of a stator core according to an embodiment.

The object of improving in suppressing iron loss is achieved by a stator core and a manufacturing method thereof welding a depressed portion and a projected portion between stator pieces on diametrally projected segment portions formed in diametrally recessed portions on outer edges of the stator pieces.

Namely, in a stator core 1, stator pieces 17 each having teeth segments 21 on an inner periphery of an annular yoke segment 20 are laminated as illustrated in FIGS. 1-7. Each stator piece 17 is provided with a diametrally recessed portion 23, a diametrally projected segment portion 25, and a depressed portion 27 and a projected portion 29 in a laminating direction, and an interface between the stator pieces 17 is provided with a fitted portion 47 and a welded portion 5.

The recessed portion 23 is provided on an outer edge 35 of each stator piece 17. The projected segment portion 25 is provided in the diametrally recessed portion 23. The depressed portion 27 and the projected portion 29 are provided respectively on a top face and a bottom face of the diametrally projected segment portion 25. The fitted portion 47 is a portion in which the depressed portion 27 and the projected portion 29 in the laminating direction are fitted by fastening between the stator pieces 17. The welded portion 5 welds the depressed portion 27 and the projected portion 29 of the fitted portions 47 in the laminating direction.

The depressed portion 27 and the projected portion 29 in the laminating direction should form the fitted portion 47 between the diametrally projected segment portions 25 in the laminating direction, shapes of which are freely implemented. The depressed portion 27 and the projected portion 29 in the laminating direction may be provided on the diametrally projected segment portion 25 in a half-blanking shape.

The stator core 1 may be provided with a second stator piece 19, a second recessed portion 41, a second projected segment portion 43, an opening portion 39, and a second fitted portion 49. The second stator piece 19 is laminated on the stator piece 17 at least at an end in the laminating direction. On an outer edge of the second stator piece 19, the second diametrally recessed portion 41 is provided. In the second diametrally recessed portion 41, the second diametrally projected segment portion 43 is provided. The second projected segment portion 43 has the opening portion 39 having a diametrally recessed shape to which the projected portion 29 in the laminating direction is fitted. In the second fitted portion 49, the projected portion 29 in the laminated direction is fitted to the opening portion 39 by fastening. In this case, the welded portion 5 is reached to a peripheral edge of the opening portion 39 and the projected portion 29 of the second fitted portion 49.

The depressed portion 27 and the projected portion 29 in the laminating direction may have circumferential widths narrower than of the projected segment portion 25. Further, the depressed portion 27 and the projected portion 29 in the laminating direction may be formed within the projected segment portion 25.

The welded portion 5 may be formed in the projected segment portions 25, 43.

A whole of the fitted portions 47 and 49 may be eliminated by the welded portions 5.

A manufacturing method of manufacturing the stator core 1 forms the stator piece 17 each having the diametrally recessed portion 23 and the diametrally projected segment portion 25 and the depressed portion 27 and the projected portion 29 in the laminating direction first. Next, a plurality of the stator pieces 17 are laminated to form the fitted portions 47 with calking. Next, the welded portion 5 is formed by welding the laminated stator pieces 17 in the laminating direction.

Further, a manufacturing method of the stator core may form the second stator piece 19 each having the opening portion 39 having a diametrally recessed shape as well as the stator piece 17 having the diametrally recessed portion 23 and the diametrally projected segment portion 25 and the depressed portion 27 and the projected portion 29 in the laminating direction. In this case, a plurality of the stator pieces 17 are laminated, the second stator piece 19 is laminated on at least at the end in the laminating direction, and the fitted portions 47 and the second fitted portion 49 are formed by fastening. Next, the welded portion 5 is formed by welding the laminated stator pieces 17 and the laminated second stator piece 19 in the laminating direction.

The forming of the stator piece 17 may, after punching contours of the diametrally recessed portion 23 and the diametrally projected segment portion 25 by pressing, form the depressed portion 27 and the projected portion 29 in the laminating direction by pressing, and punch the outer edge 35 of the stator piece 17 by pressing.

Figure 2:
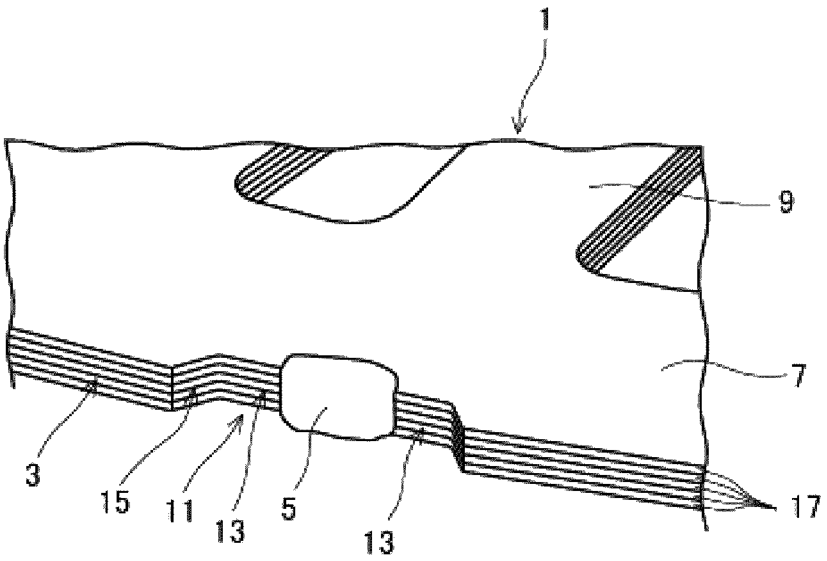
FIG. 2 is a perspective view illustrating a II-part of FIG. 1 with enlargement.
Figure 3:
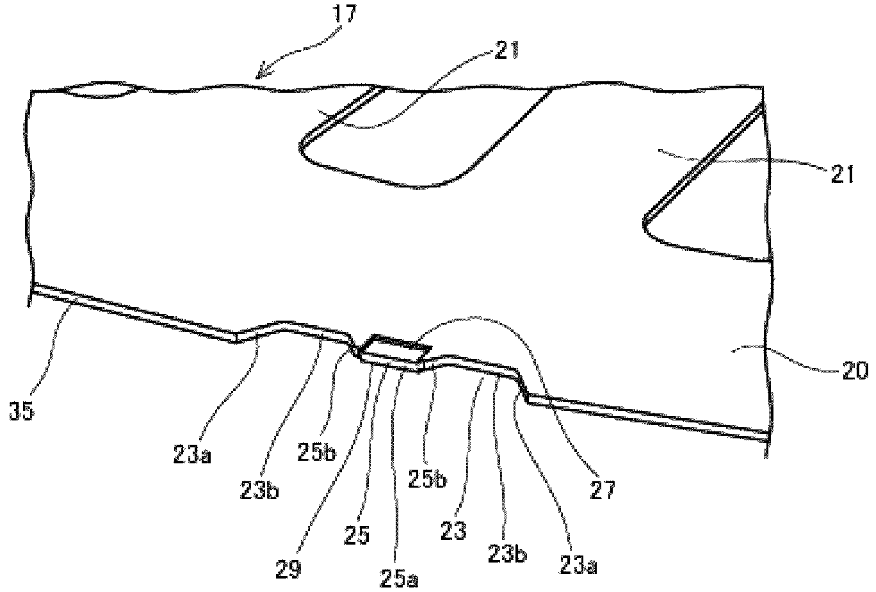
FIG. 3 is a perspective view of a stator piece corresponding to the II-part of FIG. 1.
Figure 4:
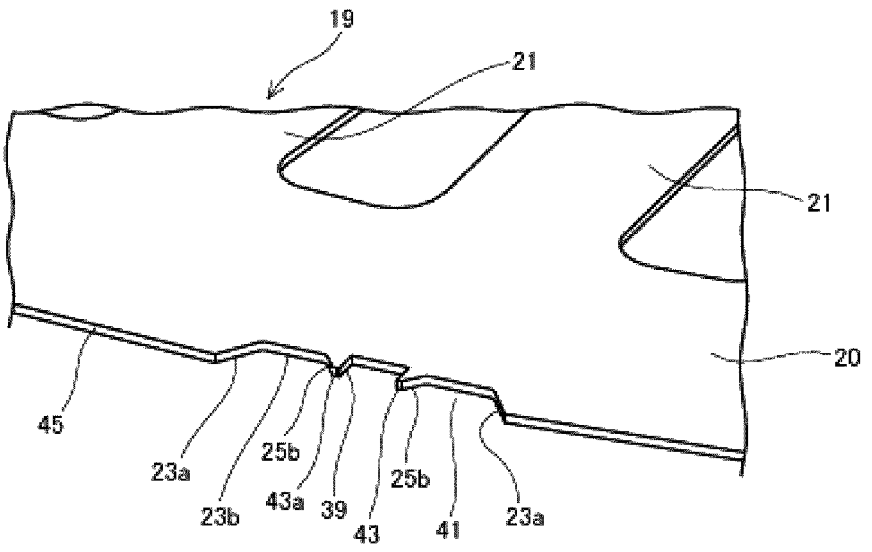
FIG. 4 is a perspective view of a second stator piece corresponding to the II-part of FIG. 1.
Figure 5:
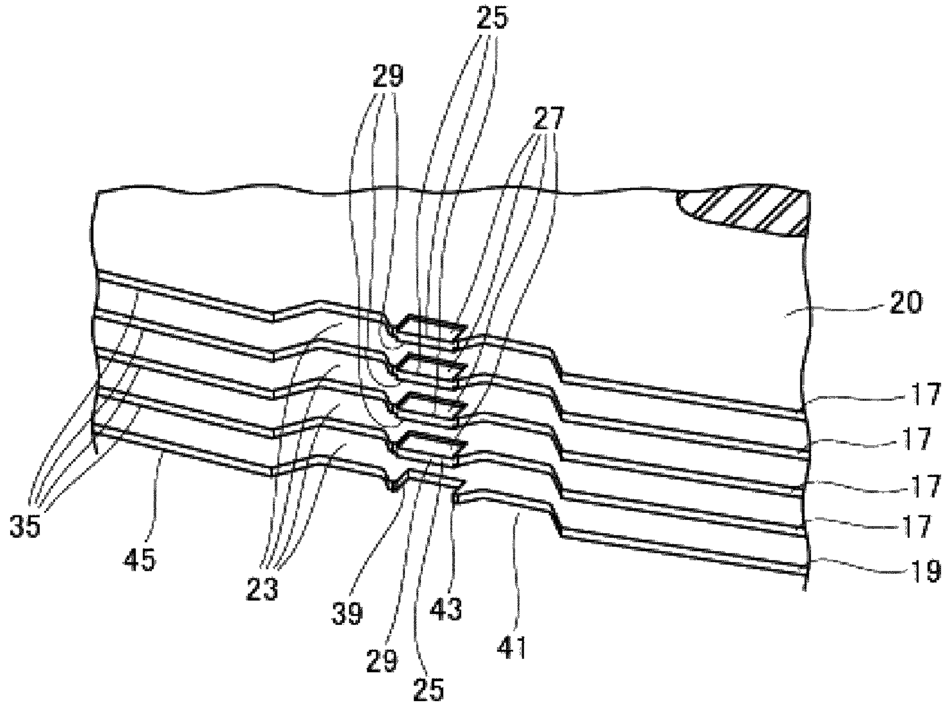
FIG. 5 is a perspective view illustrating a state before laminating the stator pieces corresponding to the II-part of FIG. 1.
Figure 6:
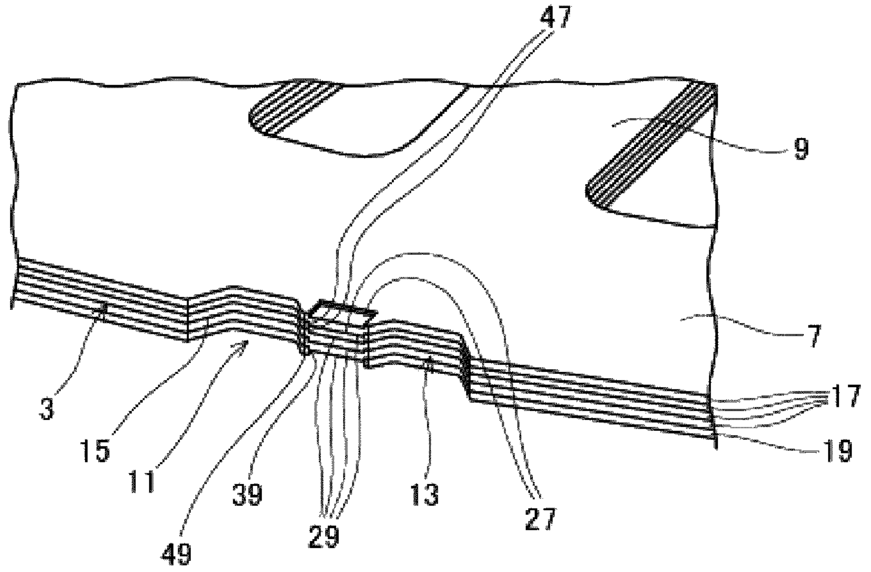
FIG. 6 is a perspective view illustrating a laminated state of the stator pieces corresponding to the II-part of FIG. 1.

FIG. 1 is a plan view of a stator core according to an embodiment of the present invention. FIG. 2 is a perspective view illustrating a II-part of FIG. 1 with enlargement. FIG. 3 is a perspective view of a stator piece corresponding to the II-part of FIG. 1. FIG. 4 is a perspective view of a second stator piece corresponding to the II-part of FIG. 1. FIG. 5 is a perspective view illustrating a state before laminating the stator pieces corresponding to the II-part of FIG. 1. FIG. 6 is a perspective view illustrating a laminated state of the stator pieces corresponding to the II-part of FIG. 1.

As illustrated in FIGS. 1 and 2, a stator core 1 forms an electromagnet by winding coils (not illustrated) thereto. The stator core 1 is configured by laminating a plurality of stator pieces 17 and connecting the stator pieces 17 together by welded portions 5. The stator core 1 is provided with the welded portions 5 on an outer peripheral face 3 substantially circular, and is provided on an inner periphery of a yoke 7 with teeth 9 projecting in a diametral direction for winding the coils.

The diametral direction is a direction along a diameter of the stator core 1. A laminating direction is a thickness direction or an axial direction of the stator core 1, and a circumferential direction is a direction along an outer periphery of the stator core 1.

The welded portion 5 is formed by welding in the laminating direction at fitted portions 47 and a second fitted portion 49 (see FIG. 6) to be explained later. The welded portion 5 is continuous in the laminating direction and may be formed so as to be spaced in the laminating direction.

According to the present embodiment, the welded portion 5 is provided over the fitted portions 47 and the second fitted portion 49 entirely in the laminating direction, the circumferential direction and the diametral direction. The welded portion 5 may be, however, formed on only part of the fitted portions 47 and the second fitted portion 49 in the laminating direction, the circumferential direction and the diametral direction.

In the embodiment of FIG. 2, the fitted portions 47 and the second fitted portion 49 of FIG. 6 are completely eliminated as a result of forming the welded portion 5. Namely, the recessed portions 27 and the projected portions 29 and the opening portion 39 to be explained later in the laminating direction are also eliminated. The welded portion 5 may be, however, formed so as to remain these.

Accordingly, in the stator core 1, the recessed portions 27, the projected portions 29 and the opening portion 31 as the fitted portions 47 and the second fitted portion 49 should be provided in the premise of the forming of the welded portion 5 and may include a form to be partially or entirely eliminated or partly remained by the welded portion 5.

The welded portion 5 is provided within a recessed groove portion 11 having a diametrally recessed shape and provided on the circular outer peripheral face 3 of the stator core 1. In particular, a surface position of a diametrally outward bump of the welded portion 5 is located on an inside within the recessed groove portion 11. According to the present embodiment, the range of the welded portion 5 slightly extends to the yoke 7 diametrally inwardly located with respect to the projected segment portion 25.

The recessed groove portion 11 has a circumferential width being greater than of the welded portion 5 in the circumferential direction. On both sides of the welded portion 5 in the circumferential direction, an outer peripheral face 13 of the stator core 1 in the recessed groove portion 11 is located. The outer peripheral face 13 circumferentially extends to continue to the circular outer peripheral face 3 on an outermost periphery through inclined faces 15 on both sides in the circumferential direction. The inclined faces 15 are formed so as to be apart from each other in the circumferential direction toward the diametral outside.

As illustrated in FIG. 3, the stator piece 17 is an annular iron core piece having teeth pieces 21 on an inner periphery of an annular yoke piece 20. On an outer periphery of the yoke piece 20, diametrally recessed portions 23 and diametrally projected segment portions 25 are provided.

The yoke piece 20 is laminated with respect to yoke pieces 20 of other stator pieces 17 to form the yoke 7. On the inner periphery of the yoke piece 20, a plurality of the teeth pieces 21 projected diametrally inwardly are provided at regular intervals in the circumferential direction. The teeth pieces 21 are laminated with respect to teeth pieces 21 of the other stator pieces 17 to form the teeth 9.

The diametrally recessed portions 23 and the diametrally projected segment portions 25 are provided on the diametral outside of the yoke piece 20 so as to correspond to the teeth pieces 21. These recessed portion 23, the projected segment portion 25, and the depressed portion 27 and the projected portion 29 in the laminated direction are arranged at every some teeth pieces 21 in the circumferential direction. In the present embodiment, the arrangement is performed on totally twelve positions every 30 degrees in a central angle.

The diametrally recessed portions 23 are formed into a recessed shape inward in the diametral direction with respect to an outer edge 35 of the stator piece 17. The outer edge 35 forms the circular outer peripheral face 3 of the stator core 1 after laminating the stator pieces 17. The recessed portions 23 form the recessed groove portions 11 of the stator core 1 after laminating the stator pieces 17.

On both sides of the recessed portion 23 in the circumferential direction, first inclined edges 23*a* are formed, the first inclined edges forming inclined faces 15 of the stator core 1 after laminating the stator pieces 17. A bottom portion 23*b* of the recessed shape of the recessed portion 23 forms the outer peripheral face 13 at the recessed groove portion 11 after the laminating. The bottom portion 23*b* is formed by a liner edge or an arc edge continuous to the first inclined edges 23*a* in the circumferential direction.

The projected segment portion 25 is provided in the diametrally recessed portion 23. The projected segment portion 25 is arranged at a circumferential center of the recessed portion 23 and projected diametrally outwardly from an outer edge 23*b* of the recessed portion 23. A tip end edge 25*a* of the projected segment portion 25 is formed by a liner edge or an arc edge and is located in the recessed portion 23 in the diametral direction.

It should be noted that the projected segment portion 25 may be arranged close to any one of the first inclined edges 23*a* in the circumferential direction. Further, a diametral position of the tip end edge 25*a* of the projected segment portion 25 may be equivalent to a diametral position of the outer edge 35 of the stator piece 17.

In the circumference direction, the projected segment portion 25 and the first inclined edges 23*a* of the recessed portion 23 are apart from each other with intervals. The intervals are, therefore, provided on both sides of the projected segment portion 25 in the circumferential direction.

A circumferential width of the projected segment portion 25 is narrower than a circumferential width of the recessed portion 23 and about one-third thereof in the present embodiment. Second inclined edges 25*b* are formed on both circumferential side portions of the projected segment portion 25. The second inclined edges 25*b* are formed so as to taper the projected segment portion 25 toward the diametral outside.

It should be noted that the circumferential width of the projected segment portion 25 may be closer to the circumferential width of the recessed portion 23, and the projected segment portion 25 and the first inclined edges 23*a* of the recessed portion 23 may be separated with cuts having almost no gap.

On a top and a bottom of the projected segment portion 25, a depressed portion 27 and a projected portion 29 in the laminating direction are respectively provided. The depressed portion 27 and the projected portion 29 are fitted to each other between the laminated stator pieces 17 by fastening. Namely, the depressed portion 27 of one stator piece 17 is fitted to the projected portion 27 of the other stator piece 17 by fastening between the laminated stator pieces 17.

The depressed portion 27 and the projected portion 29 of the present embodiment are provided on the projected segment portion 25 in a half-blanking shape. The half-blanking shape of the depressed portion 27 and the projected portion 29 in the laminating direction may be implemented by half-blanking process according to pressing. A depth of the half-blanking is about 50% of the plate thickness. The depth of the half-blanking is, however, not limited thereto. The half-blanking does not, therefore, mean to blank by a half of the plate thickness.

These depressed portion 27 and the projected portion 29 should be fitted by fastening between the laminated stator pieces 17 and are processed into a rectangular shape in a plan view, for example. Further, a pair of slits in the circumferential direction may be formed on the projected segment portion 25 and the depressed portion and the projected portion may be formed into a cantilevered shape by bending a portion between the slits in the laminating direction.

The depressed portion 27 and the projected portion 29 of the present embodiment are formed so as to reach the tip end edge 25*a* of the projected segment portion 25 on the diametral outside. Further, the depressed portion 27 and the projected portion 29 on the diametral inside are formed so as to slightly enter into the yoke piece 20 located on a diametral inside relative to the outer edge 23*b* in the recessed portion 23 around a root of the projected segment portion 25.

The diametral insides of the depressed portion 27 and the projected portion 29 may be, however, set at a diametral position identical with the outer edge 23*b* in the recessed portion 23 or a diametral outer position relative to the outer edge 23*b* in the recessed portion 23. Circumferential widths of the depressed portion 27 and the projected portion 29 are set narrower than the circumferential width of the tip end edge 25*a*.

As illustrated in FIG. 4, a second stator piece 19 before laminating is formed into the approximately same shape as the stator piece 17 excepting the opening portions 39. Namely, the second stator piece 19 is provided with teeth pieces 21, second diametrally recessed portions 41, second diametrally projected segment portions 43, and the opening portions 39 with respect to a yoke piece 20.

The yoke piece 20 and the teeth pieces 21 are the same as of the stator piece 17. The second recessed portions 41 are provided on the outer edge 45 of the second stator piece 19, and correspond to the diametrally recessed portions 23 of the stator piece 17.

The second projected segment portion 43 is provided in the second diametrally recessed portion 41 and is a component corresponding to the radially projected segment portion 25, and the second projected segment portion has the opening portion 39 in place of the depressed portion 27 and the projected portion 29.

The opening portion 39 is provided so as to correspond to the depressed portion 27 in shape, size, and position. The opening portion 39 is formed into a diametrally recessed shape and is open at a tip end edge 43*a* of the second projected segment portion 43 in the plan view. The projected portion 29 in the laminating direction of the stator piece 17 is fitted to the opening portion 39 by fastening. In addition, although the opening portion 39 passes through the second stator piece 19 in the laminating direction, a recessed portion may be formed not to pass through the second stator piece 19.

In addition, the same components as the stator piece 17 in the second stator piece 19 are represented by the same reference numerals to eliminate duplicate explanation.

As illustrated in FIG. 5, a vertical relation in the laminating direction is set for the stator pieces 17 and the second stator piece 19. The second stator piece 19 is arranged at an end of the plurality of the stator piece 17 overlappingly arranged in the laminating direction. In addition, the second stator piece 19 may be arranged between the laminated stator pieces 17.

According to the present embodiment, the depressed portion 27 and the projected portion 29 are fitted to each other by fastening (calking) between the stator pieces 17, to form the fitted portions 47 between the stator pieces 17. The fastening is to act fastening force in the laminating direction such that the depressed portion 27 and the projected portion 29 are matched with each other so as to be fitted.

Further, the projected portion 29 of the stator piece 17 in the laminating direction is fitted to the opening portion 39 of the second stator piece 19 by fastening between the stator piece 17 and the second stator piece 19, to form the second fitted portion 49 between the stator piece 17 and the second stator piece 19.

The welded portion 5 in FIG. 2 welds the depressed portion 27 and the projected portion 29 in the laminating direction at the fitted portion 47 illustrated in FIG. 6. The welded portion 5 of the present embodiment reaches the second fitted portion 49. The fitted portions 47 and the second fitted portion 49 are melted by the welded portion 5 to form a configuration of FIG. 2.

As this result, the welded portion 5 melts the depressed portions 27 and the projected portions 29 of the fitted portions 47 in the laminating direction and melts the periphery of the opening portion 39 and the projected portion 29 of the second fitted portion 49 between the stator pieces 17 and 19.

A manufacturing method of the stator core according to the present embodiment is provided with an iron-core-forming step, a laminating step, and a welding step.

In the iron-core-forming step, the stator pieces 17 and the second stator piece 19 are formed by press working. In the present embodiment, the press working for the stator piece 17 is provided with a 1st step to a 5th step.

The 1st step punches a contour of an inner periphery of the stator piece 17 by a 1st pressing. The 2nd step punches contours of the teeth pieces 21.

The 3rd step punches contours of the diametrally recessed portions 23 and the diametrally projected segment portions 25.

After that, the 4th step forms the depressed portions 27 and the projected portions 29 in the laminating direction by the half-blanking process according to pressing. The 5th step punches the outer periphery to form the outer edge 35 to punch the stator piece 17 out.

In this way, the present embodiment forms the depressed portions 27 and the projected portions 29 in the laminating direction by the pressing after punching the contours of the diametrally recessed portions 23 the diametrally projected segment portion 25 by the pressing, and punches the outer edge 35 of the stator piece 17.

In addition, the iron-core-forming step may conduct a single step for the 1st to the 5th steps. Further, the 1st step and the 2nd step may be conducted by a single step and the 3rd to the 5th steps may be conducted subsequently.

The pressing process is conducted in that order, thereby easily forming the projected segment portion 25 having the depressed portion 27 and the projected portion 29, in particular the projected segment portion 25 having the depressed portion 27 and the projected portion 29 up to the outer periphery (the tip end of the projected segment portion 25 in the diametral direction).

The pressing process for the second stator piece 19 punches an inner periphery by pressing of the 1st step and punches contours of teeth pieces 21 by the 2nd step similarly to the above.

Then, the 3rd step punches the second recessed portions 41 and the second projected segment portions 43, and contours of the opening portions 39. Thereafter, the 4th step punches the stator piece 19 out. It should be noted that the opening portion 39 may be punched out by pressing as a different step to the second projected segment portion 43 afterwards.

The laminating step laminates the plurality of the stator pieces 17 and laminates the second stator piece 19 at the end portion in the laminating direction as illustrated in FIG. 5 and FIG. 6. In this laminating state, the depressed portion 27 and the projected portion 29 are fitted to each other by fastening between the projected segment portions 25. The projected portion 29 and the opening portion 39 are fitted to each other by fastening between the projected segment portion 25 and the second projected segment portion 43.

With this fitting of the laminated state, the stator pieces 17 and the second stator piece 19 are fixed, to form a stator-piece lamination as illustrated in FIG. 6. In the stator-piece lamination, the stator pieces 17 and the second stator piece 19 are temporarily fixed in the laminated state. This eliminates or suppresses positional deviation between the stator pieces 17 and positional deviation between the stator piece 17 and the second stator piece 19.

In the welding step, the stator pieces 17 and the second stator piece 19 temporarily fixed in the laminated state are pressurized using upper and lower jigs while being positioned, to eliminate gaps between adjacent stator pieces 17 in the laminating direction and between the stator piece 17 and the second stator piece 19 or reduce the gaps to a given level or less.

In this state, the welded portions 5 are formed on the stator pieces 17 and the second stator piece 19 in the laminating direction. The welded portions 5 are formed by conducting laser welding or the like to the fitted portions 47 and the second fitted portion 49.

As this result, the depressed portion 27 and the projected portion 29 of each fitted portion 47 are welded, and the projected portion 29 and the periphery of the opening portion 39 of the second fitted portion 49 are welded, and the welded portions 5 are formed. According to the embodiment, the projected segment portions 25 and the second projected segment portions 43 including the fitted portions 47 and the second fitted portion 49 are almost eliminated by melting at the time of the welding, and the welded portion 5 is formed so as to be swelled relatively to the outer peripheral face 13 in the recessed groove portion 11 as illustrated in FIG. 2.

In this way, the present embodiment forms the welded portion 5 at the fitted portions 47 and the second fitted portion 49 of the projected segment portions 25 and the second projected segment portion 43, so that residual stress caused by the forming and the fastening of the depressed portions 27 and the projected portion 29 is eliminated or reduced to suppress iron loss.

Further, the depressed portions 27 and the projected portions 29 and the opening portions 39 are eliminated by the welding at the fitted portions 47 and the second fitted portion 49, and tensile stress does not act on the welded portion 5 due to reaction force based on shrinkage in the laminating direction at the time of solidifying to prevent the welded portion 5 from being damaged.

Additionally, an influence range of iron loss caused by the fitted portions 47, the second fitted portion 49 and the welded portion 5 is suppressed to be entered into the yoke 7 relative to the outer peripheral face 3 of the stator core 1 to the utmost in the diametral direction.

Further, the intervals are present on the both sides of the projected segment portion 25 and the second projected segment portion 43 in the circumferential direction, so that it suppresses influence of heat caused by the welded portion 5 in the circumferential direction and influence of the heat to part of the yoke 7 adjacent to the intervals in the diametral direction.

As a result, the present embodiment suppresses the influence of the iron loss caused by the fitted portions 47, the second fitted portion 49 and the welded portion 5.

Further, the welded portion 5 are formed on the projected segment portions 25 and the second projected segment portions 43, thereby promoting the melting to surely perform the welding between the stator piece 17 and the second stator piece 19.

The welded portion 5 incorporates the projected segment portions 25 to reduce use of welding material. In a case that the whole projected segment portions 25 are incorporated into the welded portion 5 so that the projected segment portions 25 are not in original form or the like, it ensures strong connection rigidity.

Further, even if fastening force is low at the fitted portions 47 and the second fitted portion 49, the present embodiment eliminates or suppresses the gaps between the laminated according to shrinkage action at the time of the bead solidifying of the welded portion 5.

If the gaps between the laminated are little, the connection rigidity is high between the laminated of the stator core 1 and deformation is eliminated or suppressed when the stator core is installed into a housing. Additionally, it eliminates or suppresses varnish penetration at the time of varnish immersion, and it makes improvements on deformation of the stator core 1.

Further, the fitted portions 47 and the second fitted portion 49 due to the calking according to the present embodiment are provided to temporarily retain the posture of the stator core lamination. Accordingly, the present embodiment does not need strict accuracy management of a calking tool unlike a conventional calked lamination retaining a posture and a strength with only calking. It, therefore, prolongs a maintenance cycle of a tool and improves productivity.

The welded portion 5 is located in the recessed groove portion 11. Accordingly, connecting force due to the welded portion 5 in the laminating direction acts on the yoke 7 on the outer peripheral face 13 on the diametral inside relative to the outer peripheral face 3 of the stator core 1.

The connection rigidity, therefore, is strongly kept between the laminated at the yoke 7 of the stator core 1. The welded portion 5 is also close to the outer peripheral face 3 of the stator core 1, so that the connection rigidity is also surely ensured between the outer peripheral faces 3 adjacent in the laminating direction.

In the stator core lamination of FIG. 6, the connecting is performed at the projected segment portions 25 in the diametrally recessed portion 23 and the second projected segment portion 43 in the second diametrally recessed portion 41, so that the connecting force is easily transferred to both the outer peripheral face 13 and the yoke 7.

In the stator core 1, the positional deviation is, therefore, eliminated or suppressed between the stator pieces 17 and between the stator piece 17 and the second stator piece 19, and this is maintained after the welding. Accordingly, it improves accuracy of the stator core 1 and raises rigidity thereof.

Further, the present embodiment appropriately keeps the posture of the stator core 1 and unifies the stator core by the welding the plurality of the stator pieces 17 and the stator piece 19 that is on the laminated end portion through the pressuring and the positioning.

The depressed portion 27 and the projected portion 29 are formed narrower than the circumferential width of the projected segment portion 25, and the opening portion 39 is formed narrower than the circumferential width of the second projected segment portion 43. Accordingly, heat is hard to escape from both sides of the depressed portion 27 and the projected portion 29 in the circumferential direction and both sides of the opening portion 39 in the circumferential direction at the time of the forming of the welded portion 5, to improve workability.

Figure 7:
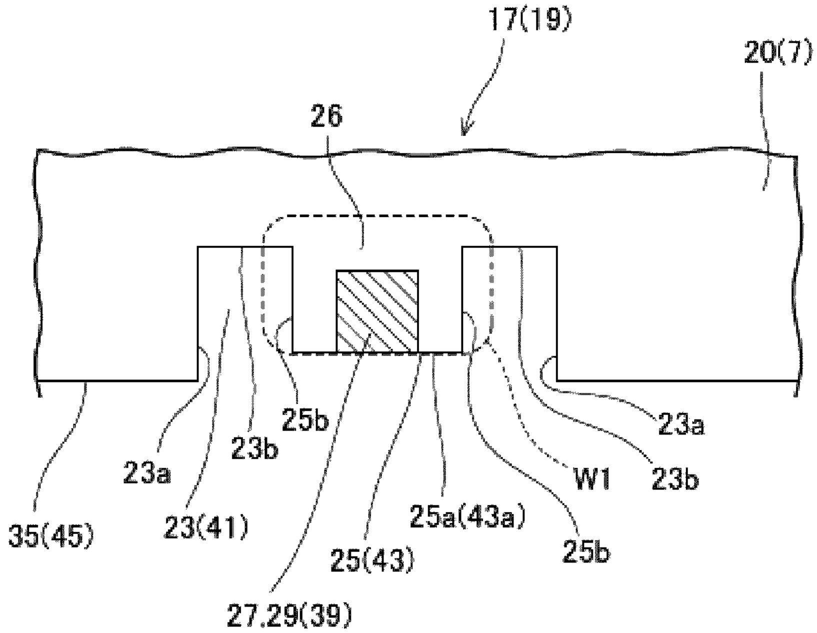
FIG. 7 is a plan view conceptually illustrating part of the stator piece with enlargement for indicating a welding range of a projected segment portion according to a modified example 1 of the embodiment.

FIG. 7 is a plan view conceptually illustrating part of the stator piece for indicating a welding range of a projected segment portion with enlargement according to a modified example 1 of the embodiment. It should be noted that the basic components are the same as of the above embodiment and the same or corresponding components are represented with the same reference numerals to eliminate duplicate explanation in the modified example 1.

In the modified example 1 of FIG. 7, the diametral positions of the depressed portion 27 and the projected portion 29 relative to the projected segment portion 25 of the stator piece 17 are outer positions relative to the yoke piece 20, and a body portion 26 of the projected segment portion 25 is shaped to be remained between the yoke piece 20 and the depressed portion 27 and the projected portion 29 and on both sides of the depressed portion 27 and the projected portion 29 in the circumferential direction.

Further, the modified example 1 employs the second stator piece 19 that is not directly illustrated and numerals doubly represented to the corresponding components with parentheses in FIG. 7. The second stator piece 19 is shaped so that a body portion 26 of the second projected segment portion 43 is remained between the opening portion 39 and the yoke piece 20 and on both sides of the opening portion 39 in the circumferential direction similar to the stator piece 17.

A welding range W1 includes a whole of the projected segment portions 25 and the second projected segment portion 43 and enters into the yoke piece 20. With the presence of the body portion 26 of the projected segment portion 25 surrounding the depressed portion 27 and the projected portion 29 and the body portion 26 of the second projected portion 43 surrounding the opening portion 39, heat is hard to escape in the welding between the depressed portion 27 and the projected portion 29 and the welding between the projected portion 29 and the periphery of the opening portion 39, and it suppresses influence of the heat relative to the yoke 7 based on the lamination of the yoke pieces 20.

In addition, the modified example provides the same effect as the above.

In FIG. 7, although the first inclined edges 23*a*, and the second inclined edges 25*b* are indicated with no inclination, they may be inclined similarly to the above embodiment.

Figure 8:
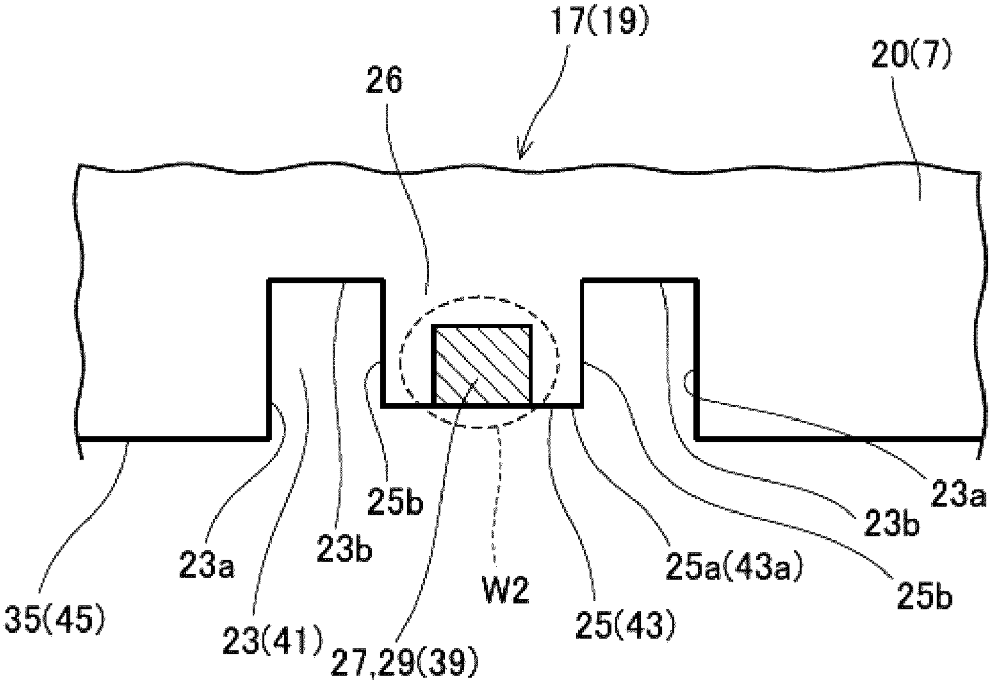
FIG. 8 is a plan view conceptually illustrating part of a stator piece with enlargement for indicating a welding range of a projected segment portion according to a modified example 2 of the embodiment.

FIG. 8 is a plan view conceptually illustrating part of a stator piece for indicating a welding range of a projected segment portion with enlargement according to a modified example 2 of the embodiment. It should be noted that the basic components are the same as of the above embodiment and the same or corresponding components are represented with the same reference numerals to eliminate duplicate explanation in the modified example 2.

As illustrated in FIG. 8, the modified example 2 makes the range of the depressed portion 27 and the projected portion 29 relative to the projected segment portion 25 of the stator piece 17 and the range of the opening portion 39 relative to the second projected segment portion 43 be the same as of the modified example 1. The second stator piece 19 is the same as of the modified example 1.

On the other hand, the modified example 2 makes a welding range W2 be within the projected segment portion 25 and the second projected segment portion 43.

In the modified example 2, heat is, therefore, further hard to escape in the welding between the depressed portion 27 and the projected portion 29 and the welding between the projected portion 29 and the periphery of the opening portion 39, and it further suppresses influence of the heat relative to the yoke 7 based on the lamination of the yoke pieces 20.

In addition, the modified example provides the same effect as the above.

Even in FIG. 8, although the first inclined edges 23*a*, and the second inclined edges 25*b* are indicated with no inclination, they may be inclined.

Figure 9A:
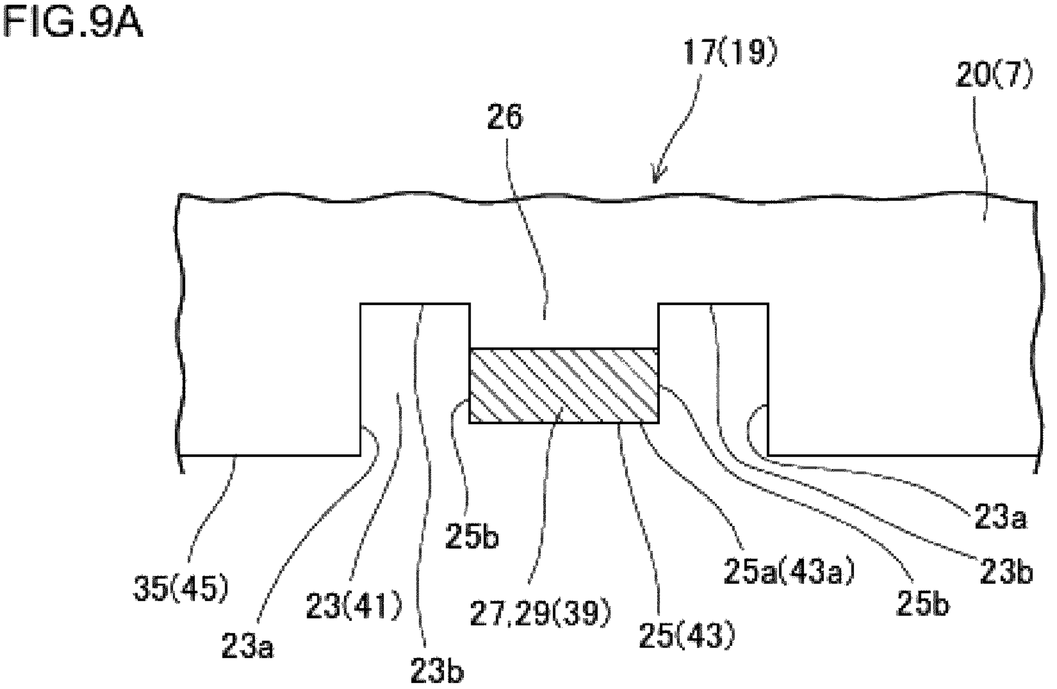
Figure 9B:
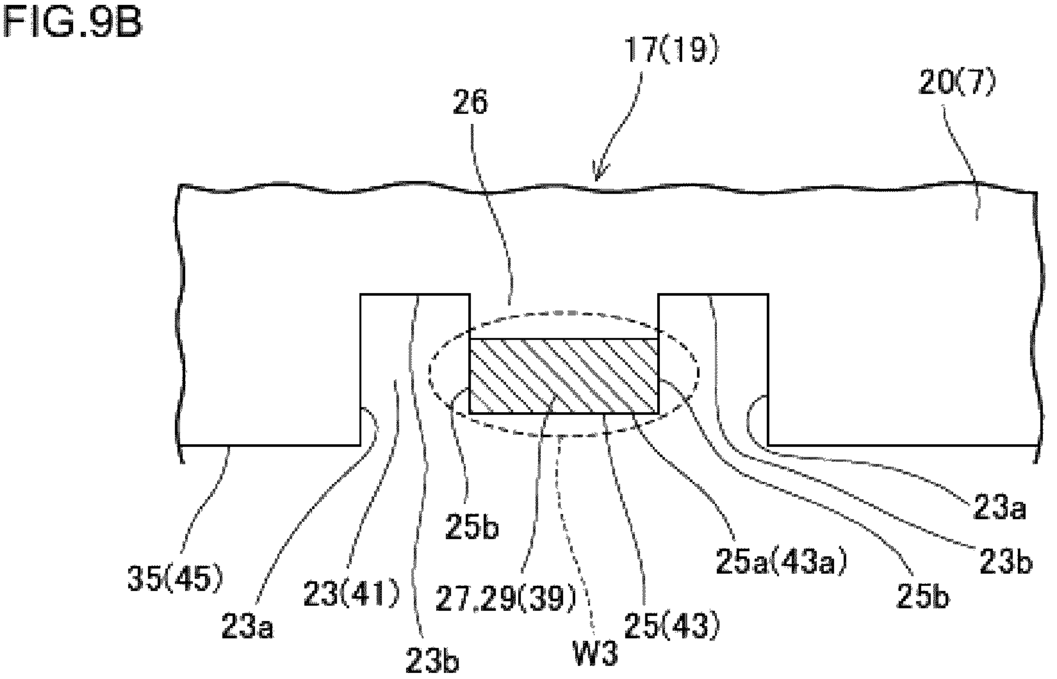

FIG. 9 are a modified example 3 of the present embodiment, in which FIG. 9A is a plan view conceptually illustrating part of a stator piece with enlargement for indicating a range of a depressed portion and a projected portion of a projected segment portion and FIG. 9B is a plan view illustrating the stator piece with enlargement for additionally indicating a welding range. It should be noted that the basic components are the same as of the above embodiment and the same or corresponding components are represented with the same reference numerals to eliminate duplicate explanation in the modified example 3. As illustrated in FIGS. 9, the modified example 3 is configured to make the range of the depressed portion 27 and the projected portion 29 relative to the projected segment portion 25 of the stator piece 17 and the range of the opening portion 39 relative to the second projected segment portion 43 entirely extend over the projected segment portion 25 and the second projected segment portion 43 in the circumferential direction based on the modified example 2. The second stator piece 19 is employed similarly to the modified example 1.

On the other hand, a welding range W3 be within the projected segment portion 25 and the second projected segment portion 43 similarly to the modified example 2 in the modified example 3.

Even the modified example 3, therefore, suppresses influence of the heat relative to the yoke 7 based on the lamination of the yoke pieces 20 in the welding between the depressed portion 27 and the projected portion 29 and the welding between the projected portion 29 and the periphery of the opening portion 39.

In addition, the modified example provides the same effect as the above.

Even in FIG. 9, although the first inclined edges 23*a*, and the second inclined edges 25*b* are indicated with no inclination, they may be inclined.

The invention claimed is:

1. A stator core, comprising:

stator pieces being laminated, the stator pieces each having an annular yoke segment and teeth segments on an inner periphery of the annular yoke segment;

a diametrally recessed portion on an outer edge of each of the stator pieces;

a diametrally projected segment portion provided in the diametrally recessed portion;

a depressed portion and a projected portion in a laminating direction provided respectively on a top face and a bottom face of the diametrally projected segment portion;

a fitted portion in which the depressed portion and the projected portion in the laminating direction are fitted by fastening between the stator pieces; and a welded portion welding the depressed portion and the projected portion of the fitted portion in the laminating direction.

2. The stator core according to claim 1, wherein the depressed portion and the projected portion in the laminating direction are provided on the diametrally projected segment portion in a half-blanking shape.

3. The stator core according to claim 1, further comprising:

a second stator piece laminated on the stator piece at least at an end of the stator core in the laminating direction;

a second diametrally recessed portion provided on an outer edge of the second stator piece;

a second diametrally projected segment portion provided in the second diametrally recessed portion;

an opening portion provided in the second projected segment portion and having a diametrally recessed shape to which the projected portion in the laminating direction;

a second fitted portion in which the projected portion in the laminated direction is fitted by fastening to the opening having the recessed shape, wherein the welded portion is led to a peripheral edge of the opening portion and the projected portion in the laminating direction of the second fitted portion.

4. A manufacturing method of manufacturing the stator core according to claim 3, comprising:

forming the stator piece having the diametrally recessed portion and the diametrally projected segment portion and the depressed portion and the projected portion in the laminating direction;

forming the second stator piece having the opening portion diametrally recessed;

laminating a plurality of the stator pieces, laminating the second stator piece to be arranged on at least the end in the laminating direction, and forming the fitted portions and the second fitted portion by fastening; and welding the laminated stator pieces and the laminated second stator piece in the laminating direction to form the welded portion.

5. The stator core according to claim 1, wherein the depressed portion and the projected portion in the laminating direction have circumferential widths narrower than of the projected segment portion.

6. The stator core according to claim 1, wherein the welded portion is formed in the projected segment portions.

7. The stator core according to claim 1, wherein the depressed portion and the recessed portion in the laminating direction are formed within the projected segment portion.

8. The stator core according to claim 1, wherein a whole of the fitted portion is eliminated by the welded portions.

9. The stator core according to claim 3, wherein a whole of the fitted portion and the second fitted portion is eliminated by the welded portions.

10. A manufacturing method of manufacturing the stator core according to claim 1, comprising:

forming the stator piece having the diametrally recessed portion and the diametrally projected segment portion and the depressed portion and the projected portion in the laminating direction;

laminating a plurality of the stator pieces to form the fitted portions with fastening; and welding the laminated stator pieces in the laminating direction to form the welded portion.

11. The manufacturing method of the stator core according to claim 10, wherein the forming of the stator piece, after punching contours of the diametrally recessed portion and the diametrally projected segment portion, forms the depressed portion and the projected portion in the laminating direction by pressing, and punches the outer edge of the stator piece.

* * * * *